US011687603B2

(12) United States Patent
Deng et al.

(10) Patent No.: US 11,687,603 B2
(45) Date of Patent: Jun. 27, 2023

(54) ENSEMBLE PREDICTOR

(71) Applicant: Microsoft Technology Licensing, LLC, Redmond, WA (US)

(72) Inventors: Weiwei Deng, Beijing (CN); Xiaoliang Ling, Beijing (CN); Feng Sun, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1253 days.

(21) Appl. No.: 16/090,269

(22) PCT Filed: Apr. 29, 2016

(86) PCT No.: PCT/CN2016/080624
§ 371 (c)(1),
(2) Date: Sep. 30, 2018

(87) PCT Pub. No.: WO2017/185318
PCT Pub. Date: Nov. 2, 2017

(65) Prior Publication Data
US 2019/0114509 A1    Apr. 18, 2019

(51) Int. Cl.
*G06F 16/95* (2019.01)
*G06F 16/9535* (2019.01)
*G06N 3/084* (2023.01)
*G06N 3/045* (2023.01)
*G06N 3/048* (2023.01)
(Continued)

(52) U.S. Cl.
CPC ......... *G06F 16/9535* (2019.01); *G06N 3/045* (2023.01); *G06N 3/048* (2023.01); *G06N 3/084* (2013.01); *G06N 5/01* (2023.01); *G06N 20/20* (2019.01)

(58) Field of Classification Search
CPC .. G06K 9/6257; G06N 3/0454; G06N 3/0481; G06N 3/084; G06N 5/003; G06N 20/20; G06F 16/9535
See application file for complete search history.

(56) References Cited

U.S. PATENT DOCUMENTS

| 6,269,353 | B1 | 7/2001 | Sethi et al. |
| 8,195,654 | B1 | 6/2012 | Riley et al. |
| 8,374,974 | B2 | 2/2013 | Chen et al. |

(Continued)

FOREIGN PATENT DOCUMENTS

| CN | 102750338 A | 10/2012 |
| CN | 104536983 A | 4/2015 |

OTHER PUBLICATIONS

"First Office Action and Search Report Issued in Chinese Patent Application No. 201680085068.1", dated Aug. 4, 2021, 22 Pages.
(Continued)

*Primary Examiner* — Qian Yang
(74) *Attorney, Agent, or Firm* — Barta, Jones & Foley, PLLC (57) ABSTRACT

Techniques for configuring and training an ensemble predictor for click probability of content on search engine results pages. In an aspect, a first stage machine learning algorithm, such as a neural network, is trained using a first training data set. The output of the trained first stage algorithm may be coupled to a second stage machine learning algorithm to form an ensemble predictor. In another aspect, the ensemble predictor is trained using a second training data set, using the output of the first stage algorithm to initialize a priori settings of the second stage algorithm.

20 Claims, 10 Drawing Sheets

(51) Int. Cl.
   G06N 5/01        (2023.01)
   G06N 20/20       (2019.01)

(56) References Cited

U.S. PATENT DOCUMENTS

| | | |
|---|---|---|
| 8,719,298 B2 | 5/2014 | Konig et al. |
| 8,977,629 B2 | 3/2015 | Goswami et al. |
| 9,053,436 B2 | 6/2015 | Dalessandro et al. |
| 2006/0294178 A1 | 12/2006 | Bernhardt et al. |
| 2010/0145972 A1 | 6/2010 | Kipersztok et al. |
| 2012/0130981 A1 | 5/2012 | Risvik et al. |
| 2013/0097011 A1 | 4/2013 | Wang et al. |
| 2015/0324690 A1 | 11/2015 | Chilimbi et al. |

OTHER PUBLICATIONS

Siqin, et al., "Click-Through Rate Prediction for Search Advertising based on Convolution Neural Network", In Journal of Intelligent Computer and Applications, vol. 5, Issue 5, Oct. 31, 2015, pp. 22-28.

"Extended European Search Report Issued in European Patent Application No. 16899831.8", dated Feb. 6, 2020, 10 Pages.

Che, et al., "Distilling Knowledge from Deep Networks with Applications to Healthcare Domain", Retrieved from https://pdfs.semanticscholar.org/358f/ac57914e0f4099094eba5f9902e275cc22ab.pdf, Dec. 11, 2015, 13 Pages.

Kim, et al., "Ensemble with Neural Networks for Bankruptcy Prediction", in Journal of Expert Systems with Applications, vol. 37, Issue 4, Apr. 1, 2010, pp. 3373-3379.

Ling, et al., "Model Ensemble for Click Prediction in Bing Search Ads", In Proceedings of the 26th International Conference on World Wide Web Companion, Apr. 3, 2017, pp. 689-698.

Trofimov, et al., "Using Boosted Trees for Click-through Rate Prediction for Sponsored Search", In Proceedings of the Sixth International Workshop on Data Mining for online Advertising and Internet Economy, Aug. 12, 2012, 6 Pages.

"Second Office Action Issued in Chinese Patent Application No. 201680085068.1", dated Feb. 21, 2022, 14 Pages.

Baqapuri, et al., "Using Neural Networks for Click Prediction of Sponsored Search", In Journal of the Computing Research Repository, Dec. 20, 2014, pp. 1-7.

Dembczynski, et al., "Predicting Ads' Click Through Rate with Decision Rules", In Proceedings of the 17th International World Wide Web Conference, Apr. 21, 2008, 8 Pages.

Graepel, et al., "Web-Scale Bayesian Click-Through Rate Prediction for Sponsored Search Advertising in Microsoft's Bing Search Engine", In Proceedings of the 27th International Conference on Machino Learning, Jun. 21, 2010, pp. 13-20.

Jerez-Aragonès, et al., "A Combined Neural Network and Decision Trees Model for Prognosis of Breast Cancer Relapse", In Journal of Artificial Intelligence in Medicine, vol. 27, Issue 1, Jan. 1, 2003, pp. 45-63.

Kocak, Taskin, "Sigmoid Functions and Their Usage in Artificial Neural Networks",Retrieved From: https://web.archive.org/web/20130814154108/https://excel.ucf.edu/classes/2007/Spring/appsII/Chapter1.pdf. Aug. 14, 2013, 29 Pages.

PCT/CN2016/080624, "International Search Report and Written Opinion issued in PCT Application No. PCT/CN2016/080624", dated Feb. 8, 2017, 6 Pages.

Tsai, et al., "Decision Tree-Based Classifier Combined with Neural-Based Predictor for Water-Stage Forecasts in a River Basin During Typhoons: A Case Study in Taiwan", In Journal of Environmental Engineering Science, vol. 29, Issue 2, Feb. 1, 2012, pp. 108-116.

Zhang, et al., "Sequential Click Prediction for Sponsored Search with Recurrent Neural Networks", In Proceedings of the Twenty-Eighth AAAI Conference on Artificial Intelligence, Jul. 27, 2014, pp. 1369-1375.

"Office Action Issued in Chinese Patent Application No. 201680085068.1", dated May 31, 2022, 25 Pages.

ENSEMBLE PREDICTOR

BACKGROUND

Search engines are an indispensable tool for organizing and presenting content found on the World Wide Web. In response to user queries for information, a search engine may generate a search engine results page (SERP) serving relevant results to the user. Such results may include, e.g., results as identified and ranked by a search engine algorithm, and/or paid advertisements relevant to the user query. To enable the search engine to generate the most optimal layout and content for the SERP, it would be desirable to provide metrics quantifying the relevance of the displayed results to user queries.

One such metric is "click probability," which measures the probability that a user who has entered a given search query will click on a displayed result. The click probability may be predicted based on factors such as user identity, search query content, results content, etc. The prediction may be treated as a classification problem in machine learning.

Relevant machine learning techniques include, e.g., logistic regression models, neural networks, and additive boosting trees, which each have their distinct advantages. For example, neural networks may have good generalization capabilities even when provided only a small set of training data, while decision trees may be especially powerful in deriving high-order feature conjunctions to reduce error residuals.

It would be desirable to provide techniques for configuring and training an ensemble predictor that combines multiple machine learning models to improve the accuracy of click probability prediction and other output variables.

DETAILED DESCRIPTION

Various aspects of the technology described herein are generally directed towards techniques for configuring and training an ensemble predictor for increased accuracy in predicting a desired output variable, such as click probability.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
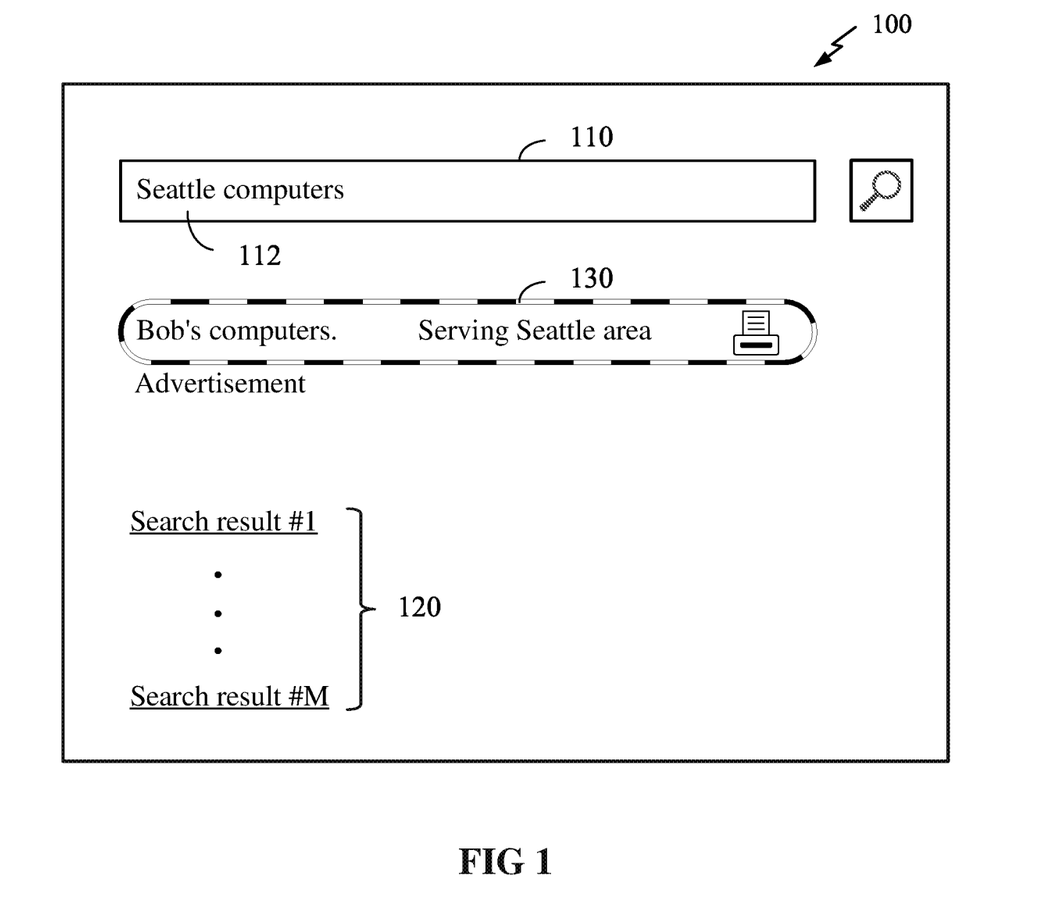
FIG. 1 illustrates a search engine interface showing certain aspects of the present disclosure.

FIG. 1 illustrates a search engine interface showing certain aspects of the present disclosure. Note FIG. 1 is shown for illustrative purposes only, and is not meant to limit the scope of the present disclosure to any particular page or text formats, search queries, advertisements, or results shown. While certain techniques are described hereinbelow in the illustrative context of predicting a click probability for an advertisement displayed on the SERP, it will be appreciated that the disclosed techniques are generally applicable to the prediction of any well-defined probability metric. For example, the ensemble predictor may be trained to predict the probability that a user will click on any displayed result (e.g., non-advertisement results) on the SERP, and thereby assist search engine developers in optimizing search results ranking and/or SERP layout. Such alternative exemplary embodiments are contemplated to be within the scope of the present disclosure.

In FIG. 1, a search engine results page (SERP) 100 of an exemplary search engine interface includes search engine query field 110, exemplary user query 112, and a plurality 120 of non-paid search results (illustratively denoted Search result #1 through Search result #M) retrieved by a search engine in response to query 112. SERP 100 also features one or more paid advertisements 130, which may be specifically targeted to the user based on the content of query 112. For example, in the scenario shown, in response to illustrative query 112 for "Seattle computers," an advertisement 130 for "Bob's computers" is placed in SERP 100.

To optimize the layout and content of the SERP, it would be desirable to predict the likelihood that a user of the search engine will click on advertisements such as advertisement 130 shown on SERP 100, or any other content shown on SERP 100. Such likelihood may depend on, e.g., a profile associated with the user (e.g., user age, gender, buying preferences, etc.), the search query's full text and/or other parameters (e.g., date, time, location, etc.), and the content of the result or advertisement. For example, given a search query for "Seattle computers," a user may click on the illustrative advertisement 130 for "Bob's computers serving the Greater Seattle area" with higher probability than an illustrative advertisement for "Suzie's computers" (not shown). Such probability may further vary based on whether the user is male or female, the user's current location, etc.

Figure 2:
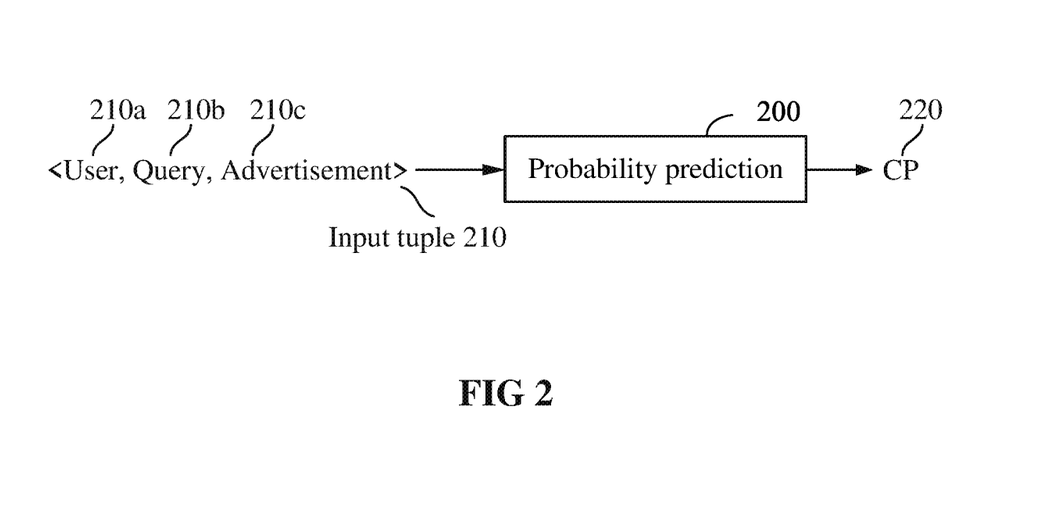
FIG. 2 shows an illustrative probability prediction module.

FIG. 2 shows an illustrative probability prediction module 200. Module 200 receives an input parameter set 210, wherein a parameter set is also denoted herein a "tuple." In an exemplary embodiment, input tuple 210 includes fields such as user 210a, query 210b, and advertisement 210c. For example, user 210a may specify user profile and/or other identifying user characteristics, query 210b may specify full text of search query 112 and/or other identifying characteristics, and advertisement 210c may specify the content of the advertisement, including title of the advertisement, summary, category, etc. Based on the specified fields of input tuple 210, module 200 calculates the "click probability" or "CP" 220, corresponding to the probability that the user will click on the advertisement.

Note specific fields of input tuple 210 are described for illustrative purposes only, and are not meant to limit the scope of the present disclosure to any choice of fields for an input parameter set. Alternative exemplary embodiments may incorporate, e.g., other fields such as user location, Web browser information, other device information, etc. Such alternative exemplary embodiments are contemplated to be within the scope of the present disclosure.

Techniques for implementing module 200 include employing machine learning algorithms such as logistic regression models, neural networks (NN's), and/or gradient-boosted decision trees (GBDT's). In particular, a plurality of training tuples (also denoted "training parameter sets" herein), e.g., extracted from a corpus of training data specifying <user, query, advertisement, click/no click> fields (e.g., as collected from historical records of search engine queries) may be used to train such algorithms to learn the functional relationships mapping input tuples, e.g., in the form <user, query, advertisement>, to predicted click probability CP. Following training, the trained algorithms may be applied online to predict CP 220 for a given input tuple 210.

In an exemplary embodiment, the field "click/no click" specified for the illustrative training tuple may refer to a binary variable, e.g., having value 1 if a user clicked on an ad, and value 0 otherwise. The "advertisement" field may refer to certain parameters captured from the advertisement for which click probability is to be predicted, e.g., its title, text, layout design, etc. In alternative exemplary embodiments, the "advertisement" field may be replaced with a general "result" field referring to parameters captured from a general result (e.g., non-advertisement) for which click probability is to be predicted. Such alternative exemplary embodiments are contemplated to be within the scope of the present disclosure.

Figure 3:
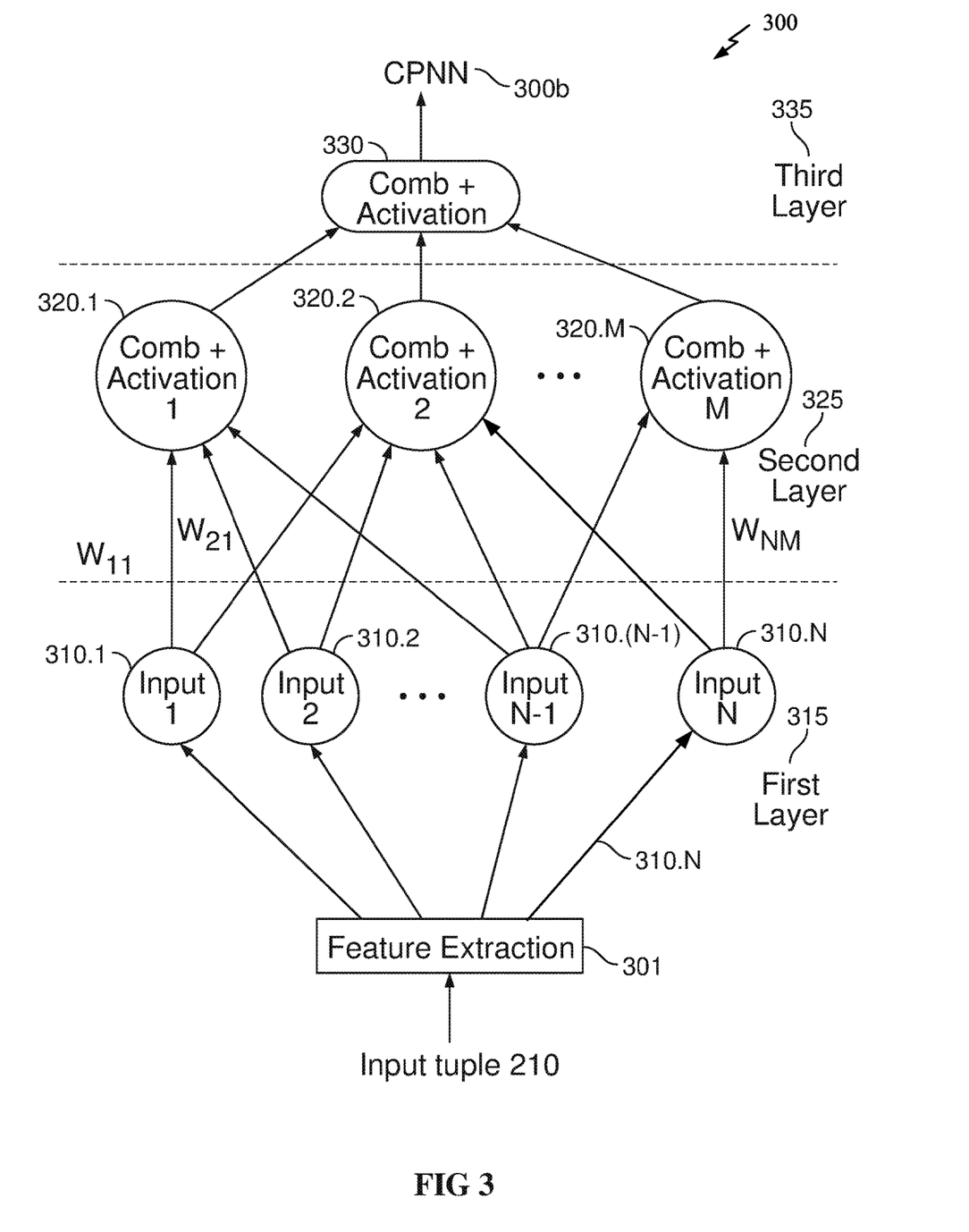
FIG. 3 illustrates an implementation of a neural network (NN) for generating a neural network click probability (CPNN) from an input tuple.

FIG. 3 illustrates an implementation of a neural network (NN) 300 for generating a neural network click probability (CPNN) 300b from an input tuple 210. Note FIG. 3 is shown for illustrative purposes only, and is not meant to limit the scope of the present disclosure to any particular types of neural networks, e.g., number of layers, nodes, etc., shown.

In FIG. 3, at block 301, feature extraction is performed on an input tuple 210. The extracted features output by block 301 are coupled to respective input nodes 310.1 through 310.N forming an input or first layer 315 of neural network 300. Input nodes of first layer 315 are further coupled to nodes 320.1 through 320.M forming a hidden or second layer 325 of neural network 300. Each node of first layer 315 may be coupled to a node of second layer 325 by a corresponding weight wnm, e.g., w11 couples node 310.1 to node 320.1, w21 couples node 310.2 to node 320.1, etc. In an exemplary embodiment, weights wnm may be updated during a training phase (not shown in FIG. 3) using an optimization function employing, e.g., backpropagation or other techniques.

In certain exemplary embodiments, each of nodes 320.1 through 320.M may implement a combination-plus-activation function. For example, node 320.1 may linearly combine all inputs weighted by corresponding weights wnm, and apply an activation function such as a sigmoid to the combined result to generate a node output. The outputs of nodes 320.1 through 320.M may further be coupled to one or more nodes of an output or third layer 335, illustratively shown in FIG. 3 as including a single node 330. In an exemplary embodiment, such couplings may also have corresponding weights that may or may not be derived from training, although such weights are not explicitly shown in FIG. 3 for ease of illustration. Node 330 may also implement a combination-plus-activation function as described hereinabove, to generate a predicted click probability CPNN 300b.

Figure 4:
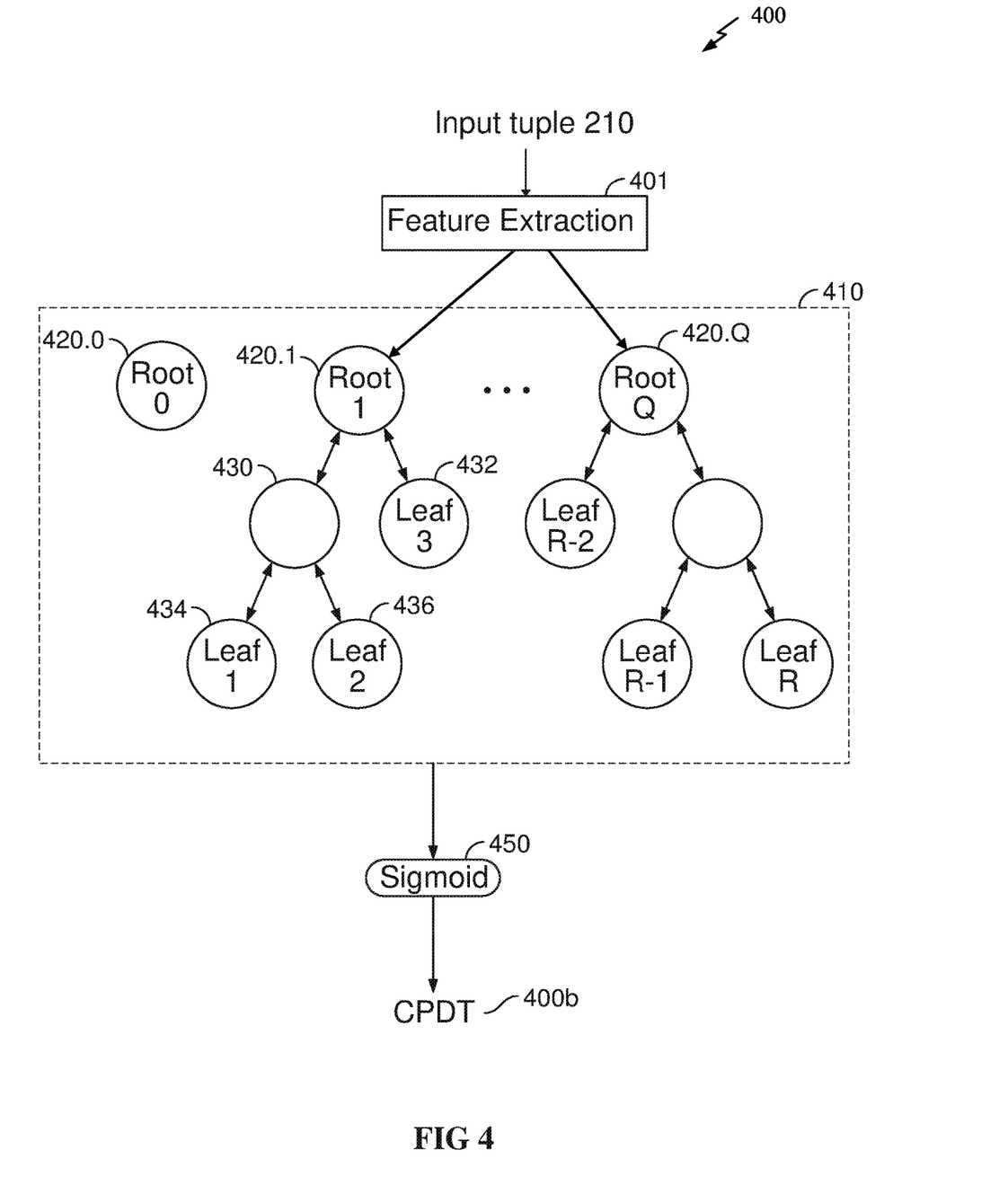
FIG. 4 illustrates an implementation of a decision tree for similarly predicting a click probability (CPDT) from an input tuple.

FIG. 4 illustrates an implementation 400 of a decision tree module 410 for predicting a click probability (CPDT) 400b from an input tuple 210. Note FIG. 4 is shown for illustrative purposes only, and is not meant to limit the scope of the present disclosure to any particular types of decision trees, e.g., number of branches, root nodes, or leaf nodes shown.

In FIG. 4, an input tuple 210 is provided to feature extraction block 401, which extracts certain relevant features of input tuple 210. The extracted features are provided to a decision tree module 410, which includes a plurality of decision trees 420.0, 420.1, . . . , 420.Q. Note for the discussion herein, trees 420.0, 420.1, . . . , 420.Q may have a sequential order: a first tree "precedes" a second tree when the first tree lies to the left of the second tree in FIG. 4. For example, tree 420.0 precedes tree 420.1, which in turn precedes tree 420.2 (not shown), etc. In this sense, it will be understood that tree 420.0 precedes all other trees in module 410, and thus tree 420.0 will also be referred to herein as an "initial tree."

It will further be appreciated that every node in every decision tree may generally be coupled to two or more lower nodes, e.g., node Root 1 is coupled to nodes 430 and 432, node 430 is in turn coupled to nodes 434 and 436, etc. The topmost node of a tree is also denoted a "root node," e.g., node Root 0, node Root 1, and note Root Q are all root nodes. Any node coupled to two or more lower nodes is also denoted a "branching node" herein, while a terminal node, e.g., node 434, 436, or 432, is also denoted a "leaf node." Initial tree 420.0 may have one leaf node.

In an exemplary embodiment, the specific values of extracted features associated with an input tuple 210 decides a particular path through each tree. In particular, every connection between a branching node of a tree and a lower node may be associated with a set of branching conditions or criteria. Starting from the root node and proceeding downwards, the path through each tree will traverse different nodes depending on whether the extracted features satisfy the conditions associated with a particular branch.

For example, assume node 430 in tree 420.1 is associated with "feature age" as an extracted feature and also a branching condition. Then if "feature age">20, then node 430 may proceed to node 434, otherwise node 430 may proceed to node 436. A single path may thus proceed down the tree from the root node to a single leaf node. For example, an illustrative path through tree 420.1 (also referred to as "Path 1" hereinbelow) may traverse node Root 1, node 430, and node 434 (also labeled "Leaf 1").

In a specific type of decision tree module known as an additive boosting decision tree module, each leaf node contains a "tree output value" for the corresponding tree. Based on the selected path for each tree, a "final output value" for tree module 410 is computed by adding together all the individual tree output values associated with each selected path's leaf node. In this sense, each decision tree may be understood to "boost" the module, with the objective of each subsequent tree being to reduce the error residual of the preceding trees.

In an exemplary embodiment, the final output value may be expressed as a "logit" (or log odds), defined as the mathematical function logit(x)=y=log [x/(1−x)], wherein x is the probability of being positive, and log is the natural logarithm. The final output value may be transformed by a sigmoid function 450 to recover the desired click probability, or CPDT 400b, wherein the sigmoid function is defined mathematically as sigmoid(y)=1/(1+e$^{-y}$).

In an exemplary embodiment, the tree output value of the initial tree 420.0 may be initialized as log [p/(1−p)], wherein p corresponds to the a priori probability. In such an exemplary embodiment, each decision tree may be configured or trained to reduce the residual error of the sum of the preceding trees' output values.

In an exemplary embodiment, training of tree module 410 may proceed by deriving optimum classification criteria and branching structure for each tree based on available training data, e.g., using gradient boosting techniques. In an exemplary embodiment, such training data may include training tuples, e.g., specified as <user, query, advertisement, click/no click>.

While either of neural network 300 or decision tree module 400 may be independently trained and constructed to execute the functionality of prediction module 200 according to the techniques described hereinabove, it will be appreciated that an ensemble predictor incorporating two or more machine learning algorithms in multiple stages may afford certain advantages. For example, neural networks may have good generalization capabilities when dealing with features even when provided only a small set of training data, while decision trees may be employed to reduce error residuals, and are especially powerful in deriving high-order feature conjunctions. Accordingly, it would be desirable to provide techniques for configuring and training an ensemble probability predictor to enhance the accuracy of probability prediction.

Figure 5:
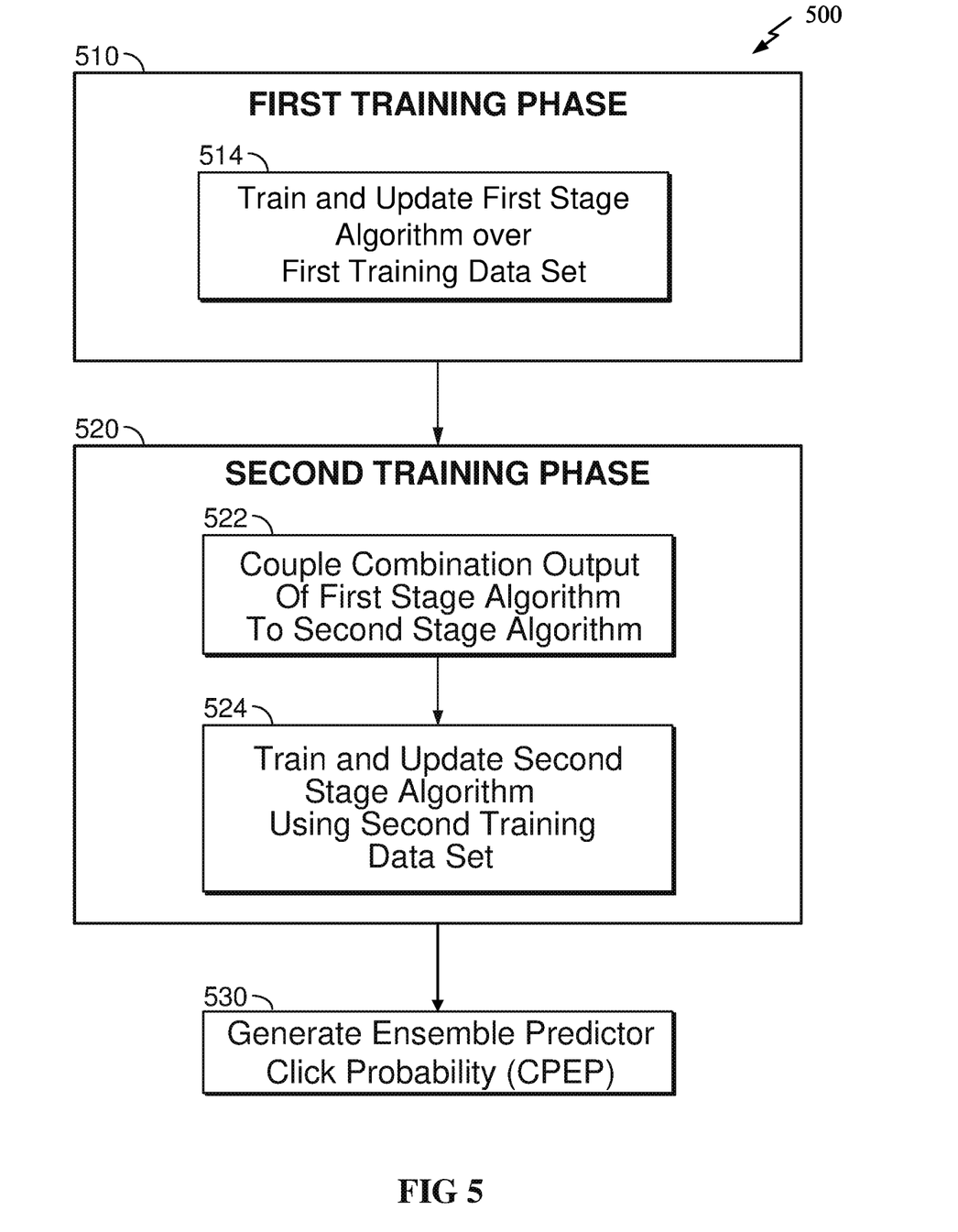
FIG. 5 illustrates an exemplary embodiment of a method for training and operating an ensemble predictor.

FIG. 5 illustrates an exemplary embodiment 500 of a method for training and operating an ensemble predictor. Note FIG. 5 is shown for illustrative purposes only, and is not meant to limit the scope of the present disclosure to any particular method, types of training data sets, or configurations of neural networks or decision trees shown.

Figure 6:
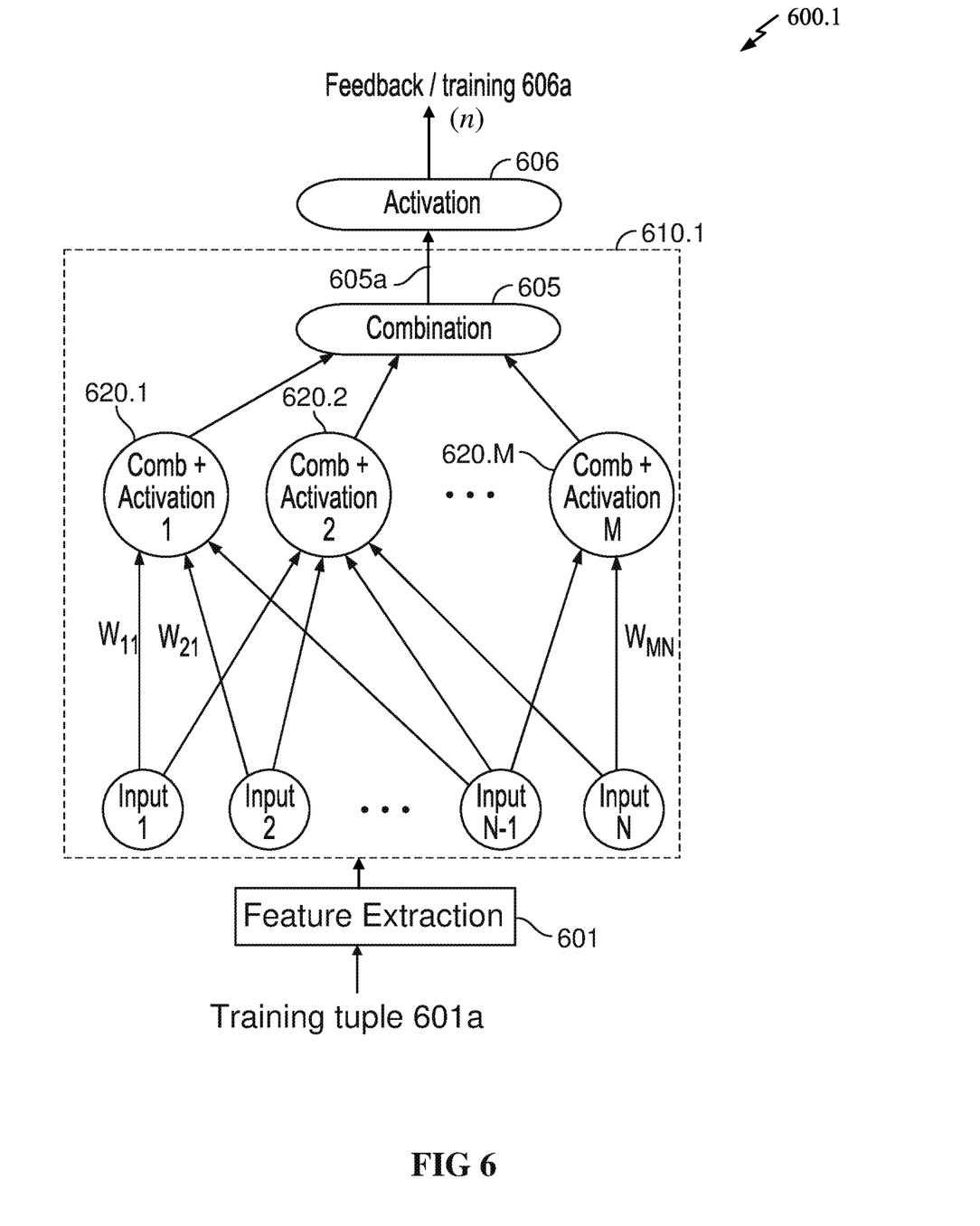
FIG. 6 illustrates an exemplary configuration of an ensemble predictor during the first training phase.

In FIG. 5, block 510 denotes a "first training phase" of method 500, and FIG. 6 illustrates an exemplary configuration 600.1 of an ensemble predictor during the first training phase. Note the particular techniques for training are described herein for illustrative purposes only, and is not meant to limit the scope of the present disclosure to any particular techniques for training neural networks, e.g., to the use of any particular loss functions.

At block 514 of first training phase 510, a first stage algorithm is trained and updated over a first training data set. The first training data set may include a first plurality of training parameter sets, also denoted training tuples.

In an exemplary embodiment, the first stage algorithm may correspond to a neural network module. In particular, as shown in the exemplary embodiment of FIG. 6, neural network module 600.1 may be trained in a similar manner as described with reference to neural network 300 in FIG. 3. For example, a first training data set may be provided to the neural network, and weights and/or other parameters of the neural network may be updated based on comparison of the neural network output with target values in the first training data set.

Note in neural network module 600.1, the outputs of second-layer nodes 620.1 through 620.M may be combined by a combination block 605 to generate a combined output 605a (also denoted "n" or "combination output" herein), which is then coupled to an activation function 606 to generate a feedback/training signal 606a. Note, for reasons which will be apparent hereinbelow with reference to the discussion of second training phase 520, activation function 606 is shown as lying outside the neural network module 610.1 of the ensemble predictor.

In an exemplary embodiment, a suitable loss function such as the cross-entropy loss function may be used for training. Updating of the first- and/or second-layer weights may proceed by, e.g., comparing output 605a or "n" with a learning target (also denoted "y" herein) using a cross-entropy loss function L defined as follows (Equation 1):

$$L = -y \log n - (1-y)\log(1-n);$$

wherein log again represents the natural logarithm function. In an exemplary embodiment, n may be a real number from 0 to 1 representing the predicted click probability, while learning target y may be a binary value of 0 (e.g., corresponding to a click event in the "click/no click" field of training tuple) or 1 (corresponding to a no click event). Subsequent to calculating the loss function value L for a first training data sample, weights wnm can then be adjusted using techniques such as backpropagation with gradient descent, etc.

Note the training at block 514 may be iterated over all training tuples in the first training data set. In an exemplary embodiment, the first training data set may include, e.g., thousands or millions of training tuples. In an exemplary embodiment, each training tuple may specify <user, query, advertisement, click/no-click>. The training tuples may be obtained, e.g., by monitoring historical usage data as may be logged by any online search engines serving results and advertisements to actual user queries.

Figure 7:
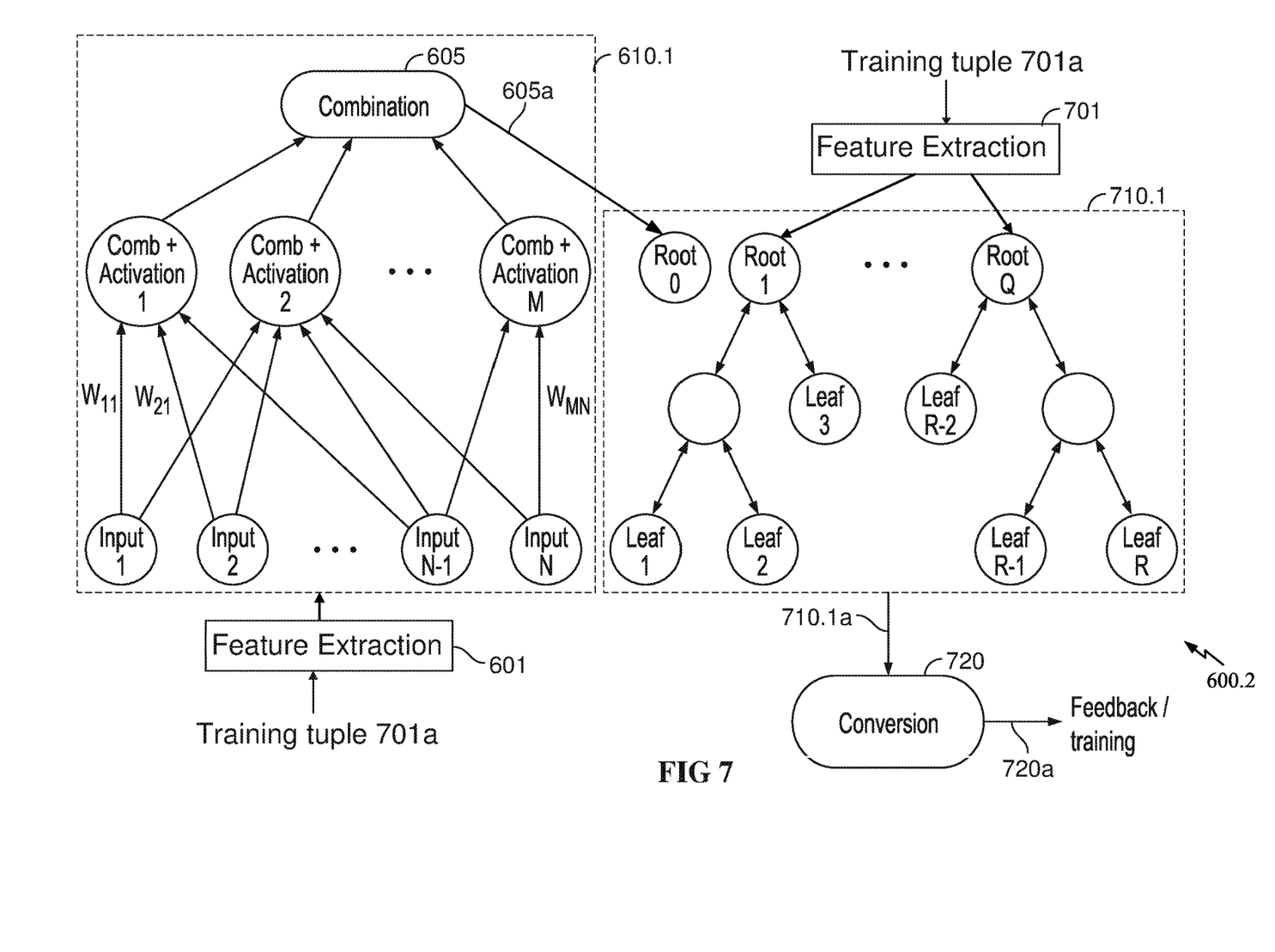
FIG. 7 illustrates an exemplary configuration of the ensemble predictor during the second training phase.

In FIG. 5, following first training phase 510, a decision tree module of the ensemble predictor may be trained during "second training phase" 520. FIG. 7 illustrates an exemplary configuration 600.2 of the ensemble predictor during the second training phase.

At block 522 of second training phase 520, a combination output of the first stage algorithm is coupled to the second stage algorithm.

In an exemplary embodiment, the second stage algorithm may correspond to a decision tree module incorporating multiple trees. In an exemplary embodiment, the combination output may correspond to output 605a of combination block 605 of neural network module 610.1, which may be coupled to decision tree module 710.1 of the ensemble predictor, as shown in FIG. 7. A feature extraction block 701 is coupled to decision tree module 710.1.

In particular, the activation block 606 during first phase training 510 may be bypassed, e.g., output 605a may be directly coupled to decision tree module 710.1. In an exemplary embodiment, output 605a is directly coupled to the initial decision tree of module 710.1, having only one root node (also a leaf node) labeled "Root 0". In particular, the tree output value contributed by node Root 0 of the initial tree is set equal to output 605a.

It will be appreciated that coupling the output of neural network module 610.1 to tree 710.1 in this manner effectively allows the decision trees in module 710.1 to refine an estimate of the click probability generated by neural network module 610.1. In particular, when tree module 710.1 is implemented as a plurality of additive decision trees such as a gradient-boosted decision trees, each decision tree may be understood to contribute a residual correction term to a preceding estimate, thus further refining the neural network estimate of click probability.

At block 524, the second stage algorithm is trained and updated using a second training data set. The second training data set may include a second plurality of training parameter sets 701*a*, also denote second training tuples.

In an exemplary embodiment, tree module 710.1, e.g., the classification criteria node structure of its constituent trees, may be trained and updated using the second training data set at block 524. For example, training tuples The second training data set may include, e.g., thousands or millions of training tuples, and may be obtained in a similar fashion as the first training data set. In an exemplary embodiment, the second training data set may include a greater number of (e.g., 10 times more) training tuples than the first training data set. During second phase training, the second plurality of training tuples 701*a* may be provided to both neural network feature extraction block 601 and decision tree feature extraction block 701.

Note the output 710.1*a* of tree module 710.1 may be converted by conversion module 720 into a signal 720*a* for feedback/training purposes. In an exemplary embodiment, wherein output 710.1*a* is expressed as logit, then module 720 may apply a sigmoid transform to convert from logit to probability. Note this exemplary embodiment of conversion module 720 is not meant to limit the scope of the present disclosure to any particular scales or units employed for computation by network module 610.1 or tree 710.1.

In FIG. 5, following second training phase 520, the ensemble predictor click probability (CPEP) may be generated at block 530 (also referred to herein as the "online phase").

Figure 8:
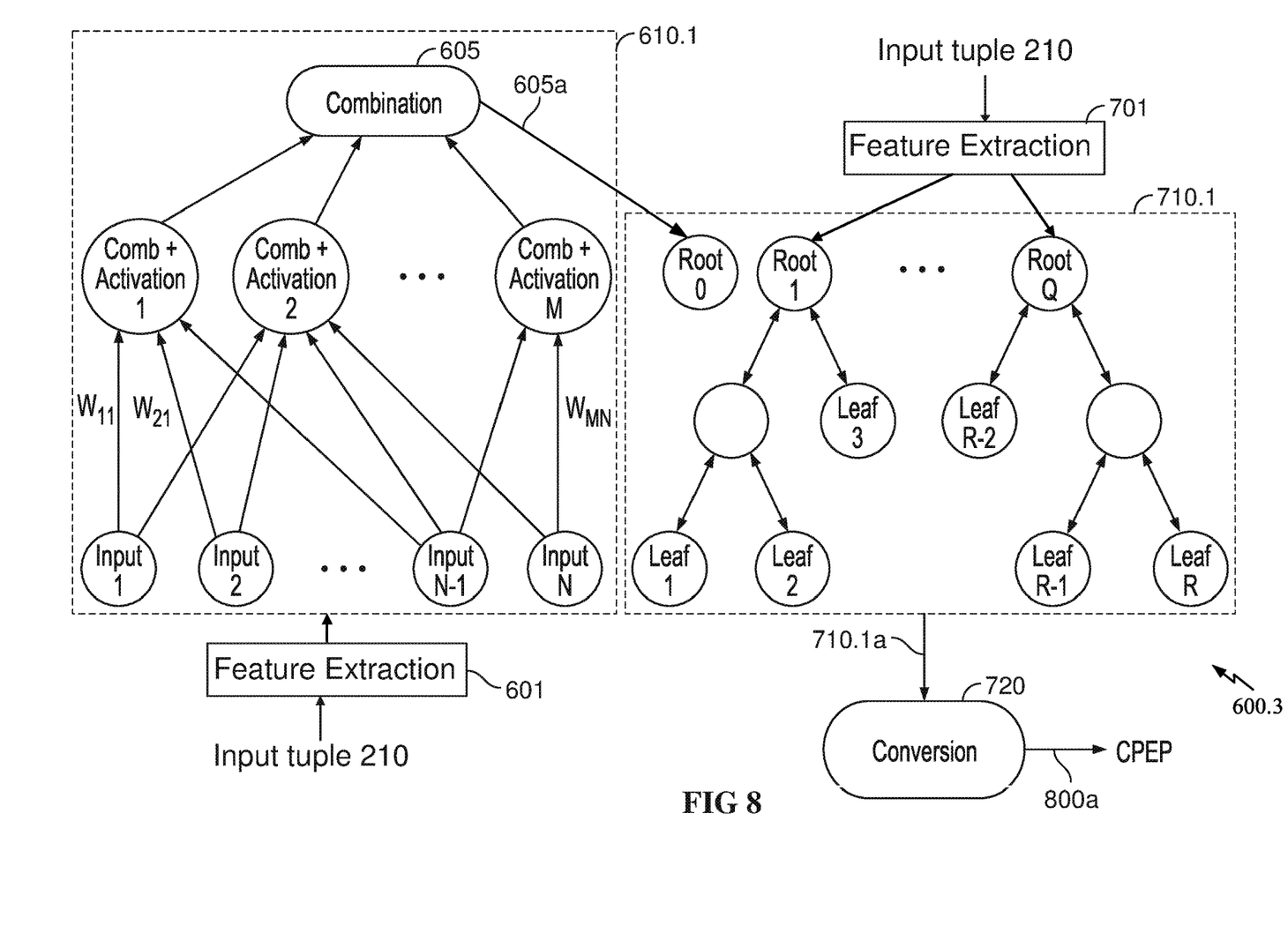
FIG. 8 illustrates an exemplary embodiment of a configuration of the ensemble predictor during online operation, with parameters as derived from the training performed as described hereinabove.

In an exemplary embodiment, block 530 may proceed using the trained neural network module 610.1 and trained decision tree 710.1 to generate the ensemble predictor click probability, or CPEP. FIG. 8 illustrates an exemplary embodiment of a configuration 600.3 of the ensemble predictor during the online phase, with parameters as derived from the training performed as described hereinabove. In particular, the ensemble predictor includes a neural network module 610.1, configured with parameters derived from first training phase 510 as described hereinabove. The output 605*a* of neural network module 610.1 is coupled to decision tree module 710.1, configured with parameters derived from second training phase 520 as described hereinabove. Note the input tuples 210 to neural network feature extraction block 601 and decision tree feature extraction block 701 may be derived from input tuples for which click probability is to be predicted. Such tuples may include, e.g., specification of <user, query, advertisement>, as described hereinabove.

The output 710.1*a* of decision tree module 710.1 may be provided to a conversion module 720 (e.g., implementing a sigmoid function) to generate the ensemble predictor click probability 800*a*, corresponding to the desired predicted click probability 220 earlier described hereinabove with reference to FIG. 2.

Figure 9:
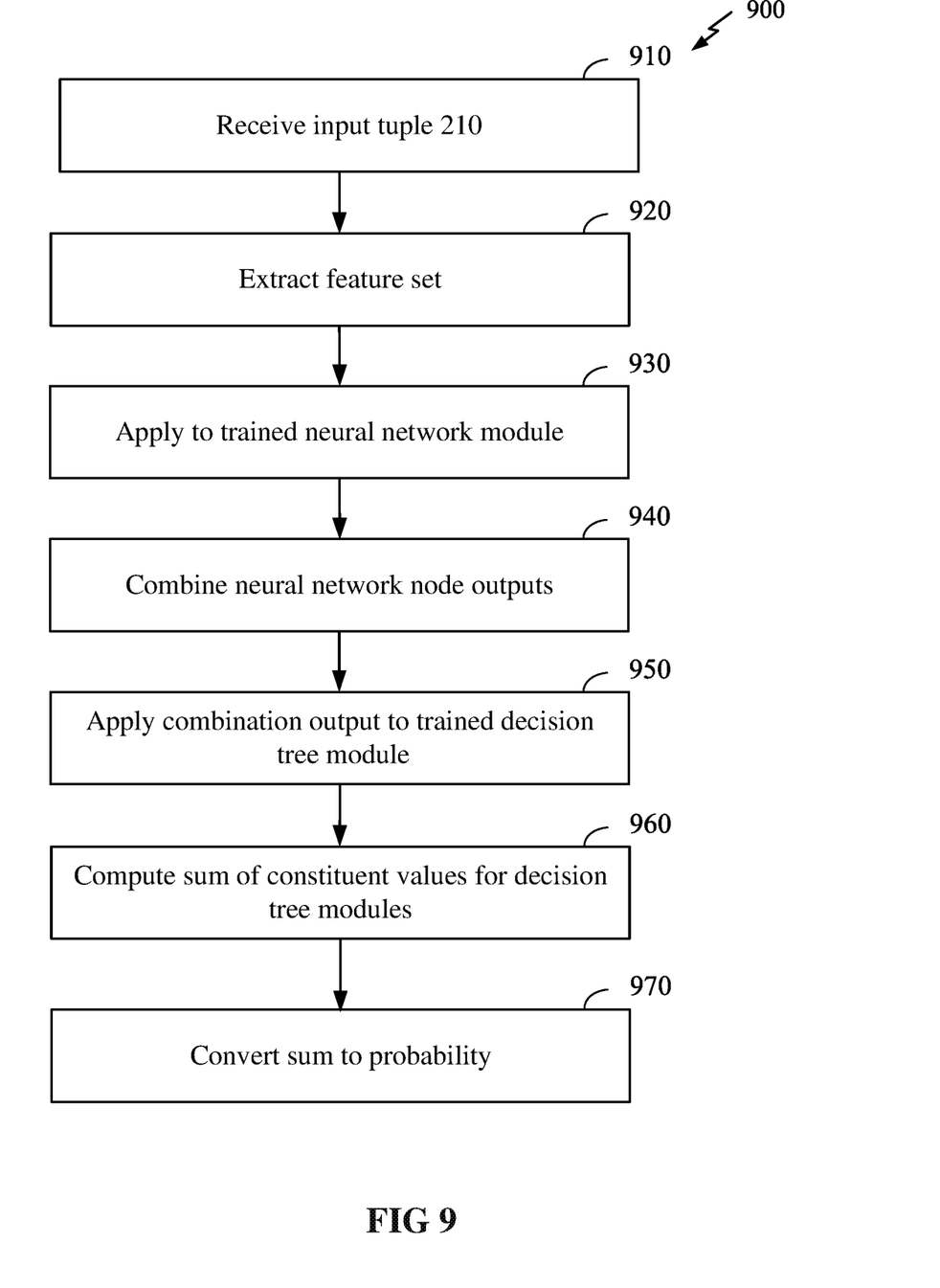
FIG. 9 illustrates an exemplary embodiment of a method for online operation of the ensemble predictor.

FIG. 9 illustrates an exemplary embodiment of a method 900 for the online phase of the ensemble predictor. Reference may be made simultaneously to configuration 600.3 of the ensemble predictor during the online phase as illustrated in FIG. 8. Note FIG. 9 is shown for illustrative purposes only, and is not meant to limit the scope of the present disclosure.

In FIG. 9, at block 910, an input tuple 210 is received.

At block 920, a feature set is extracted (e.g., using block 601) from input tuple 210.

At block 930, the extracted feature set is applied to a trained neural network module 610.1 comprising neural network node outputs.

At block 940, neural network node outputs are combined, e.g., to generate a combination output 605*a*.

At block 950, the combination output is applied to a trained decision tree module comprising a plurality of decision trees, each decision tree generating a tree output value.

At block 960, a sum of tree output values of the decision tree module is computed.

At block 970, the sum is converted to probability (if necessary) to generate the ensemble predictor click probability, or CPEP.

While certain exemplary embodiments of an ensemble predictor have been described incorporating a neural network module coupled to a decision tree module, alternative exemplary embodiments are contemplated to be within the scope of the present disclosure. For example, in an alternative exemplary embodiment, first training phase 510 may instead be conducted using artificial machine learning algorithms other than a neural network, e.g., a logistic regression algorithm. In such cases, following such an alternative first training phase, the output of the trained (first-stage) algorithm may be coupled to a second artificial machine learning algorithm, to initialize one or more a priori probabilities programmed into the second-stage algorithm during a second training phase. In alternative exemplary embodiments, the number of artificial machine learning algorithms sequentially trained and cascaded in this manner need not be restricted to two, and an ensemble predictor may generally include more than two stages. Such alternative exemplary embodiments are contemplated to be within the scope of the present disclosure.

While certain exemplary embodiments have been described with reference to configuring and training first and second stage algorithms for predicting a click probability as described with reference to FIG. 2, it will be appreciated that the techniques described herein may readily be utilized in other applications as well. For example, the ensemble predictor may generally be applied to any task utilizing machine learning algorithms, e.g., detecting relevance of search results to search queries, automatic query completion, etc. Such alternative exemplary embodiments are contemplated to be within the scope of the present disclosure.

Figure 10:
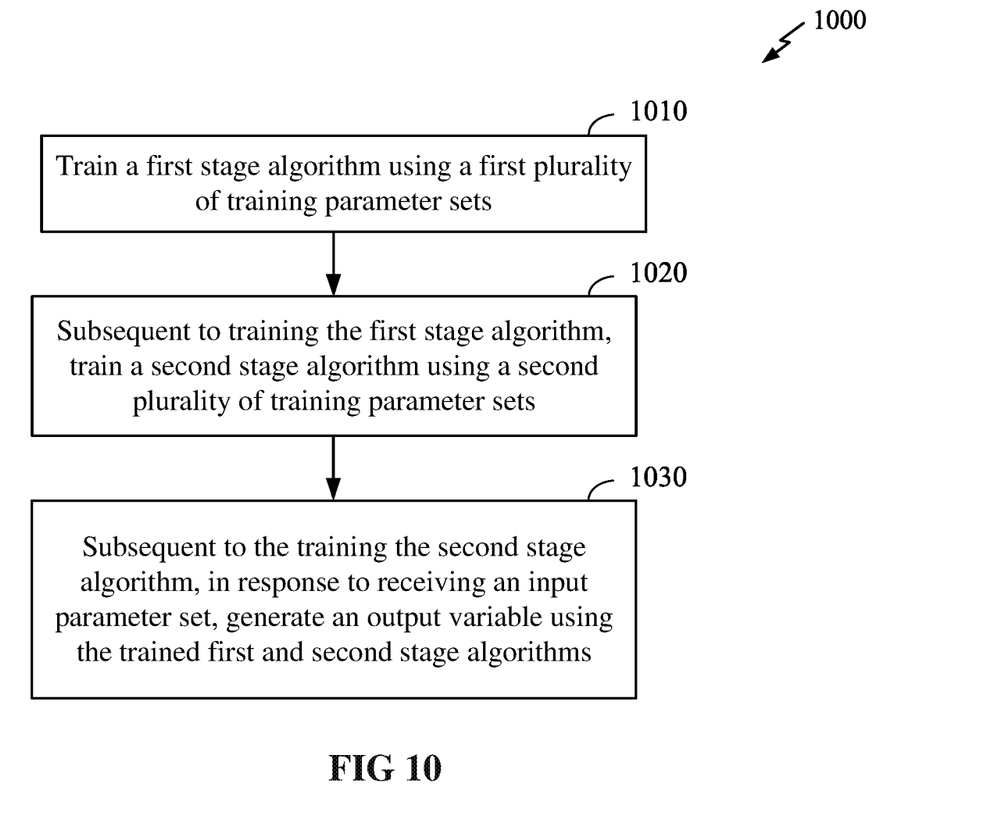
FIG. 10 illustrates an alternative exemplary embodiment of a method according to the present disclosure.

FIG. 10 illustrates an exemplary embodiment 1000 of a method according to the present disclosure.

In FIG. 10, at block 1010, a first stage algorithm is trained using a first plurality of training parameter sets.

At block 1020, subsequent to the training the first stage algorithm, a second stage algorithm is trained using a second plurality of training parameter sets. The training the second stage algorithm may comprise, for each of the second plurality of training parameter sets, initializing a setting of the second stage algorithm using an output of the first stage algorithm.

At block 1030, subsequent to the training the second stage algorithm, in response to receiving an input parameter set, an output variable is generated using the trained first and second stage algorithms.

Figure 11:
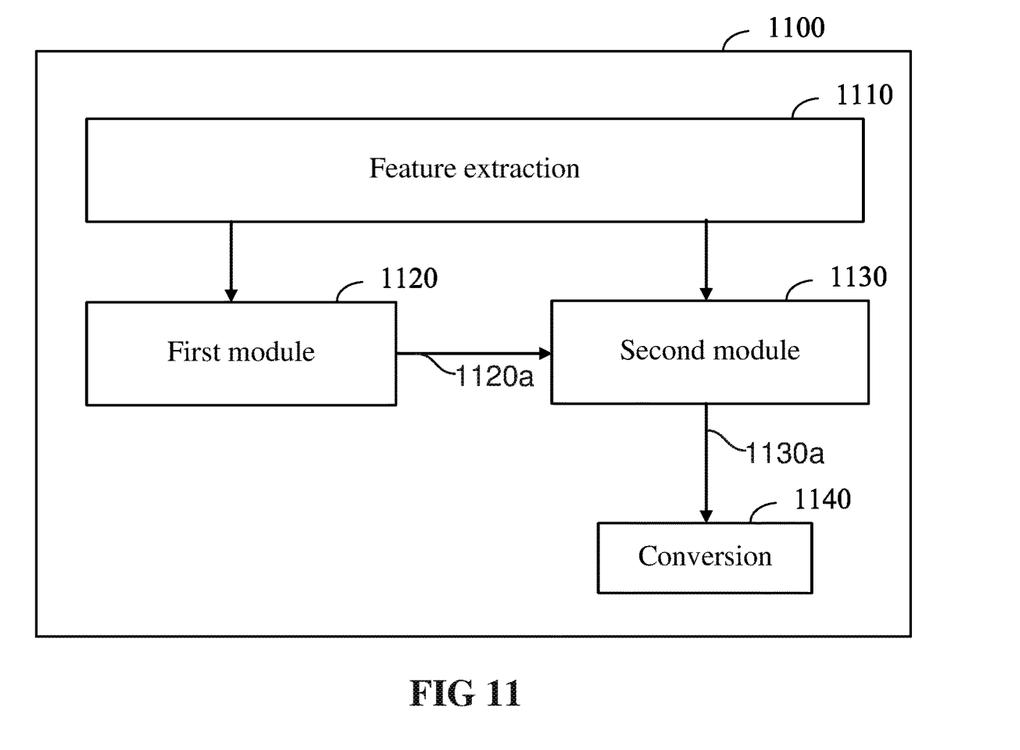
FIG. 11 illustrates an exemplary embodiment of an apparatus according to the present disclosure.

FIG. 11 illustrates an exemplary embodiment of an apparatus 1100 according to the present disclosure.

In FIG. 11, apparatus 1100 comprises a feature extraction module 1110 configured to extract a feature set for an input parameter set; a first module 1120 configured to implement a trained neural network for processing the extracted feature set, the first module comprising a combination output 1120*a* corresponding to a combination of a plurality of nodes of the trained neural network; a second module 1130 configured to implement a plurality of decision trees comprising an initial tree, each decision tree generating a tree output value, the trained decision tree module comprising an input corresponding to a tree output value of an initial tree of the trained decision tree, the second module configured to generate a sum 1130a of tree output values for the extracted feature set; and a conversion module 1140 configured to convert said sum to generate a probability.

Figure 12:
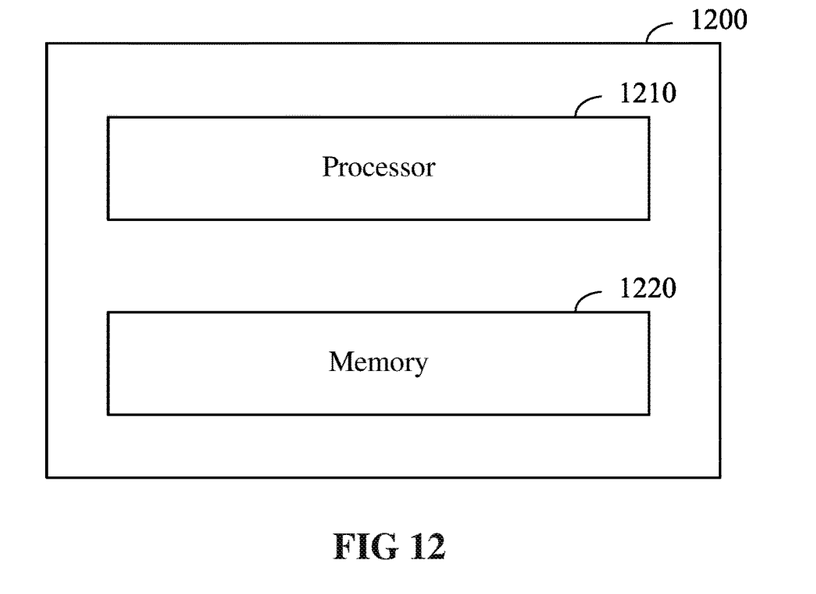
FIG. 12 illustrates an alternative exemplary embodiment of an apparatus according to the present disclosure.

FIG. 12 illustrates an alternative exemplary embodiment of an apparatus 1200 according to the present disclosure.

In FIG. 12, apparatus 1200 comprises a processor 1210 and a memory 1220 storing instructions for causing the processor 1210 to: receive an input tuple; extract a feature set from the input tuple; apply the extracted feature set to a trained neural network module comprising a neural network node outputs; combine values associated with the neural network node outputs; apply the combined values to a trained decision tree module comprising a plurality of decision trees, each decision tree generating a tree output value; compute a sum of tree output values corresponding to the extracted feature set; convert the sum to generate a probability.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A method comprising:
   training a first machine learning model using a first training parameter set;
   subsequent to the training of the first machine learning model, training a second machine learning model using a second training parameter set, the training of the second machine learning model comprising initializing a setting of the second machine learning model using an output of the first machine learning model; and
   subsequent to the training of the second machine learning model, in response to receiving an input parameter set, generating an output variable comprising an estimate using the trained first machine learning model to generate the estimate and the trained second machine learning model to refine the generated estimate.

2. The method of claim 1, the input parameter set comprising features corresponding to a user, a search query, and an advertisement, the output variable comprising a predicted click probability, and refining the generated estimate comprising at least one of: reducing an error residual and deriving a high-order feature conjunction.

3. The method of claim 1, the first machine learning model comprising a neural network algorithm comprising a first layer and a second layer.

4. The method of claim 1, the second machine learning model comprising a plurality of decision trees.

5. The method of claim 1, the second machine learning model comprising a decision tree, the decision tree comprising a leaf node contributing an additive term to a variable functionally related to the output variable.

6. The method of claim 5, the initializing the setting of the second machine learning model comprising setting an additive term contributed by the decision tree.

7. The method of claim 5, further comprising generating a click probability by applying a sigmoid transform to the variable functionally related to the output variable.

8. The method of claim 1, the first machine learning model comprising a logistic regression model.

9. An apparatus comprising:
   a neural network configured to train a first machine learning model using a first training parameter set;
   a decision tree configured to train a second machine learning model using a second training parameter set, the training of the second machine learning model comprising initializing a setting of the second machine learning model using an output of the first machine learning model; and
   a an ensemble predictor configured to, subsequent to the training of the second machine learning model, in response to receiving an input parameter set, generate an output variable comprising an estimate using the trained first machine learning model to generate the estimate and the trained second machine learning model to refine the generated estimate.

10. The apparatus of claim 9, the input parameter set comprising features corresponding to a user, a search query, and an advertisement, the output variable comprising a predicted click probability, and refining the generated estimate comprising at least one of: reducing an error residual and deriving a high-order feature conjunction.

11. The apparatus of claim 9, the first machine learning model comprising a neural network algorithm comprising a first layer and a second layer.

12. The apparatus of claim 9, the second machine learning model comprising a plurality of decision trees.

13. The apparatus of claim 9, the decision tree comprising a leaf node contributing an additive term to a variable functionally related to the output variable.

14. The apparatus of claim 13, the initializing the setting of the second machine learning model comprising setting an additive term contributed by the decision tree.

15. The apparatus of claim 13, further comprising applying a sigmoid transform to the variable functionally related to the output variable to generate a click probability.

16. The apparatus of claim 13, the first machine learning model comprising a logistic regression model.

17. An apparatus comprising a processor and a memory storing instructions for causing the processor to:

train a first machine learning model using a first training parameter set;

subsequent to the training of the first machine learning model, train a second machine learning model using a second training parameter set, the training of the second machine learning model comprising initializing a setting of the second machine learning model using an output of the first machine learning model; and subsequent to the training of the second machine learning model, in response to receiving an input parameter set, generate an output variable comprising an estimate using the trained first machine learning model to generate the estimate and the trained second machine learning model to refine the generated estimate.

18. The apparatus of claim 17, the input parameter set comprising features corresponding to a user, a search query, and an advertisement, the output variable comprising a predicted click probability, and refining the generated estimate comprising at least one of: reducing an error residual and deriving a high-order feature conjunction.

19. The apparatus of claim 17, the second machine learning model comprising a decision tree, the decision tree comprising a leaf node contributing an additive term to a variable functionally related to the output variable.

20. The apparatus of claim 19, the decision tree comprising an initial tree, the initializing the setting of the second machine learning model comprising setting an additive term contributed by the initial tree, and further comprising generating a click probability by applying a sigmoid transform to the variable functionally related to the output variable.

* * * * *